United States Patent
Shen

(10) Patent No.: US 8,708,297 B2
(45) Date of Patent: Apr. 29, 2014

(54) VARIABLE COMPOSITE SUPPORT STRUCTURE FOR SUPPORTING AN ELECTRONIC PRODUCT

(76) Inventor: Cheng-Hsien Shen, Tainan (TW)

(*) Notice: Subject to any disclaimer, the term of this patent is extended or adjusted under 35 U.S.C. 154(b) by 163 days.

(21) Appl. No.: 13/244,633

(22) Filed: Sep. 25, 2011

(65) Prior Publication Data

US 2013/0075569 A1    Mar. 28, 2013

(51) Int. Cl.
*H05K 5/00* (2006.01)
*H05K 7/00* (2006.01)
*A47B 91/00* (2006.01)
*A47G 29/00* (2006.01)

(52) U.S. Cl.
USPC ...... 248/346.06; 248/917; 248/919; 248/448; 248/419; 248/420; 248/429; 248/176.1; 248/176.3; 248/298.1; 361/679.01; 361/679.02; 361/679.26; 361/679.3; 361/679.56

(58) Field of Classification Search
USPC ......... 248/346.06, 917–923, 441.1, 446, 448, 248/371, 419–420, 429, 176.1, 176.3, 207, 248/309.1, 298.1; 361/679.01–679.02, 361/679.26, 679.3, 679.55, 679.56
See application file for complete search history.

(56) References Cited

U.S. PATENT DOCUMENTS

| | | | | |
|---|---|---|---|---|
| 6,491,171 B2* | 12/2002 | Maier-Hunke | ................... | 211/47 |
| 7,708,240 B2* | 5/2010 | Homer et al. | ................. | 248/130 |
| 7,997,507 B2* | 8/2011 | Lin et al. | ........................ | 238/371 |
| 8,387,938 B2* | 3/2013 | Lin | .............................. | 248/456 |
| 2001/0054594 A1* | 12/2001 | Maier-Hunke | ................... | 211/47 |
| 2010/0163701 A1* | 7/2010 | Lin et al. | ....................... | 248/310 |

* cited by examiner

*Primary Examiner* — Terrell McKinnon
*Assistant Examiner* — Christopher Garft
(74) *Attorney, Agent, or Firm* — Alan Kamrath; Kamrath IP Lawfirm, P.A.

(57) ABSTRACT

A support structure for an electronic product includes a base (20), a support block (21), at least one connecting block (22), and an extension block (23). The base has a first guide channel (201) and a second guide channel (202). The support block has a first guide rail (210), a first connecting channel (211) and a side rail (212). The connecting block has a second guide rail (220), a first connecting rail (221) and a second connecting channel (222). The extension block has a third guide rail (230) and a second connecting rail (231). Thus, the base, the support block, the connecting block and the extension block are combined in different manners so that the inclined angle, space and height of the support structure can be adjusted arbitrarily so as to support the electronic product of different specifications and sizes.

13 Claims, 16 Drawing Sheets

VARIABLE COMPOSITE SUPPORT STRUCTURE FOR SUPPORTING AN ELECTRONIC PRODUCT

BACKGROUND OF THE INVENTION

1. Field of the Invention

The present invention relates to a support structure and, more particularly, to a support structure for supporting an electronic product, such as a tablet PC, a digital photo frame, an electronic book, an electronic screen, a cell phone, an i-pad, an MP3, 4 or 5 and the like.

2. Description of the Related Art

A conventional support seat is used to support an electronic product, such as a tablet PC, a digital photo frame, an electronic book, an electronic screen, a cell phone, an i-pad, an MP3, 4 or 5 and the like, so that the electronic product is supported by the support seat and is placed on a table in an inclined manner so as to facilitate a user operating the electronic product. However, the conventional support seat is only available for a single electronic product and cannot fit another electronic product of different specifications and sizes.

BRIEF SUMMARY OF THE INVENTION

In accordance with the present invention, there is provided a support structure, comprising a base, a support block, at least one connecting block, and an extension block. The base has a substantially L-shaped profile and has a longer side and a shorter side. The longer side of the base is provided with a first guide channel and a second guide channel. The support block has an end portion provided with a first guide rail. The support block has a first side provided with a first connecting channel and a second side provided with a side rail. The connecting block has an end portion provided with a second guide rail. The connecting block has a first side provided with a first connecting rail and a second side provided with a second connecting channel. The extension block has an end portion provided with a third guide rail. The extension block has a side provided with a second connecting rail.

The primary objective of the present invention is to provide a variable composite support structure for supporting an electronic product.

According to the primary advantage of the present invention, the base, the support block, the connecting block and the extension block are combined in different manners so that the inclined angle, space and height of the support structure can be adjusted arbitrarily so as to support the electronic product of different specifications and sizes, thereby enhancing the versatility of the support structure, and thereby decreasing the costs of purchase.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
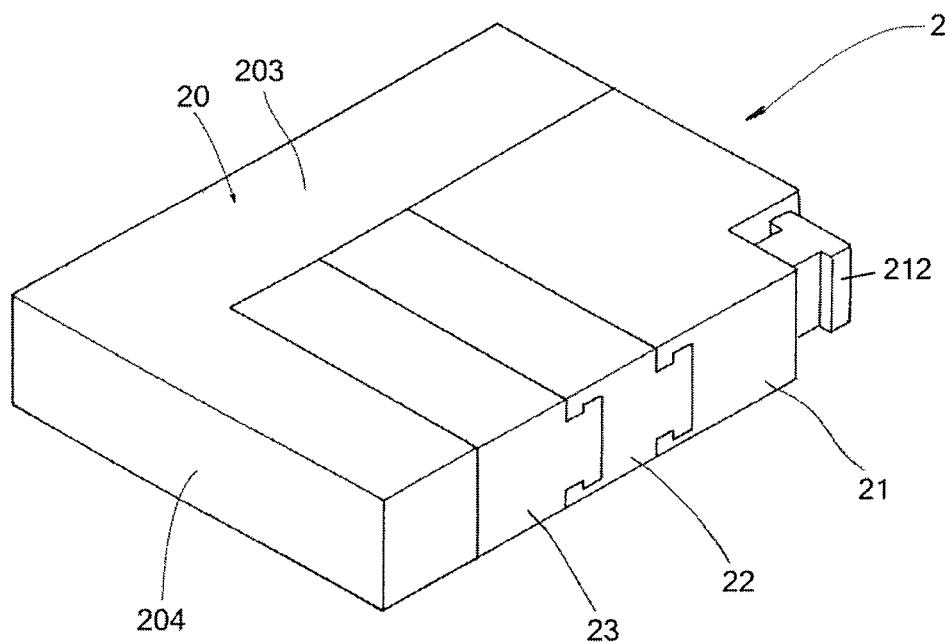
FIG. 1 is a perspective view of a support structure in accordance with the preferred embodiment of the present invention.
Figure 2:
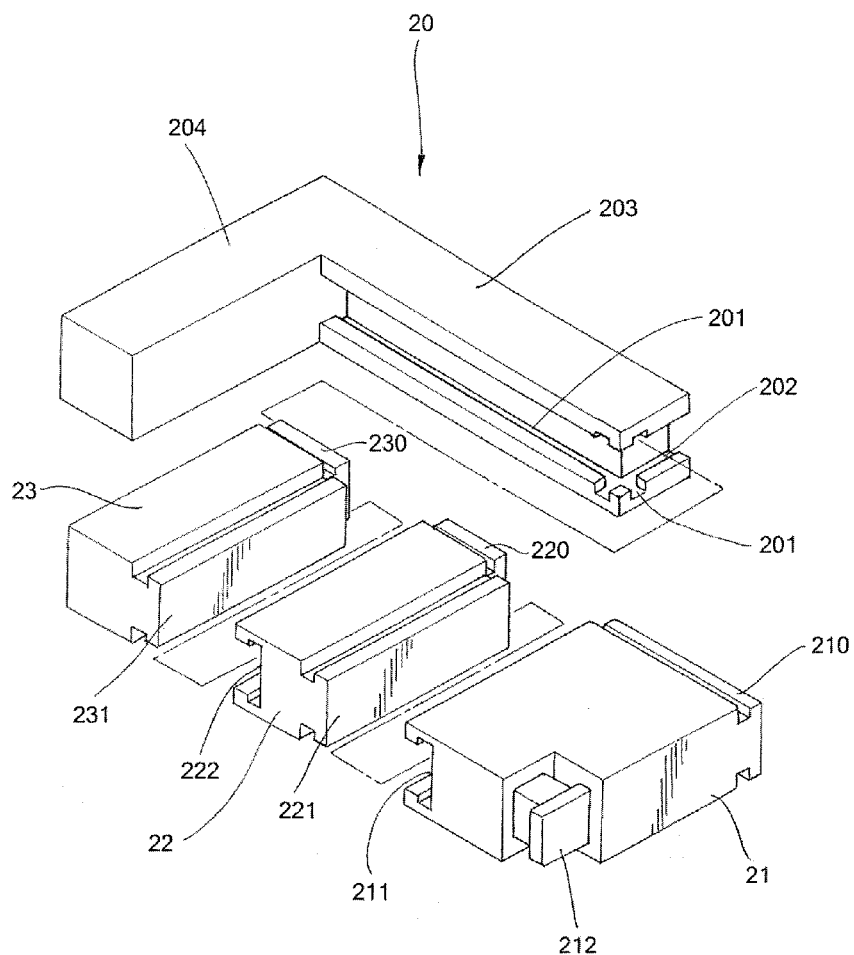
FIG. 2 is an exploded perspective view of the support structure as shown in FIG. 1.

Referring to the drawings and initially to FIGS. 1 and 2, a support structure 2 in accordance with the preferred embodiment of the present invention comprises a base 20, a support block 21, at least one connecting block 22, and an extension block 23.

The base 20 is made of a flexible material and has an anti-slip function. The base 20 has a substantially L-shaped profile and has a longer side 203 and a shorter side 204. The longer side 203 of the base 20 is provided with a first guide channel 201 and a second guide channel 202. The second guide channel 202 of the base 20 is perpendicular to the first guide channel 201 of the base 20. The second guide channel 202 of the base 20 has a length smaller than that of the first guide channel 201 of the base 20.

The support block 21 is made of a flexible material and has an anti-slip function. The support block 21 has an end portion provided with a first guide rail 210. The support block 21 has a first side provided with a first connecting channel 211 and a second side provided with a side rail 212. The first guide rail 210 of the support block 21 is perpendicular to the first connecting channel 211 of the support block 21 and perpendicular to the side rail 212 of the support block 21.

The connecting block 22 is made of a flexible material and has an anti-slip function. The connecting block 22 has an end portion provided with a second guide rail 220. The connecting block 22 has a first side provided with a first connecting rail 221 and a second side provided with a second connecting channel 222. The second guide rail 220 of the connecting block 22 is perpendicular to the first connecting rail 221 of the connecting block 22 and perpendicular to the second connecting channel 222 of the connecting block 22.

The extension block 23 is made of a flexible material and has an anti-slip function. The extension block 23 has an end portion provided with a third guide rail 230. The extension block 23 has a side provided with a second connecting rail 231. The third guide rail 230 of the extension block 23 is perpendicular to the second connecting rail 231 of the extension block 23.

In assembly, the first connecting rail 221 of the connecting block 22 is inserted into the first connecting channel 211 of the support block 21 so that the connecting block 22 is combined with the support block 21, and the second guide rail 220 of the connecting block 22 is parallel with the first guide rail 210 of the support block 21. Then, the second connecting rail 231 of the extension block 23 is inserted into the second connecting channel 222 of the connecting block 22 so that the extension block 23 is combined with the connecting block 22, and the third guide rail 230 of the extension block 23 is parallel with the second guide rail 220 of the connecting block 22. Thus, the support block 21, the connecting block 22 and the extension block 23 are combined together and are disposed at a transverse state. Then, the third guide rail 230 of the extension block 23, the second guide rail 220 of the connecting block 22 and the first guide rail 210 of the support block 21 are in turn inserted into the first guide channel 201 of the base 20, so that the base 20, the support block 21, the connecting block 22 and the extension block 23 are combined together and are disposed at a transverse state, and the support structure 2 forms a rectangular block. Preferably, the support structure 2 comprises a plurality of connecting blocks 22 which are connected with each other to extend the support structure 2.

Figure 3:
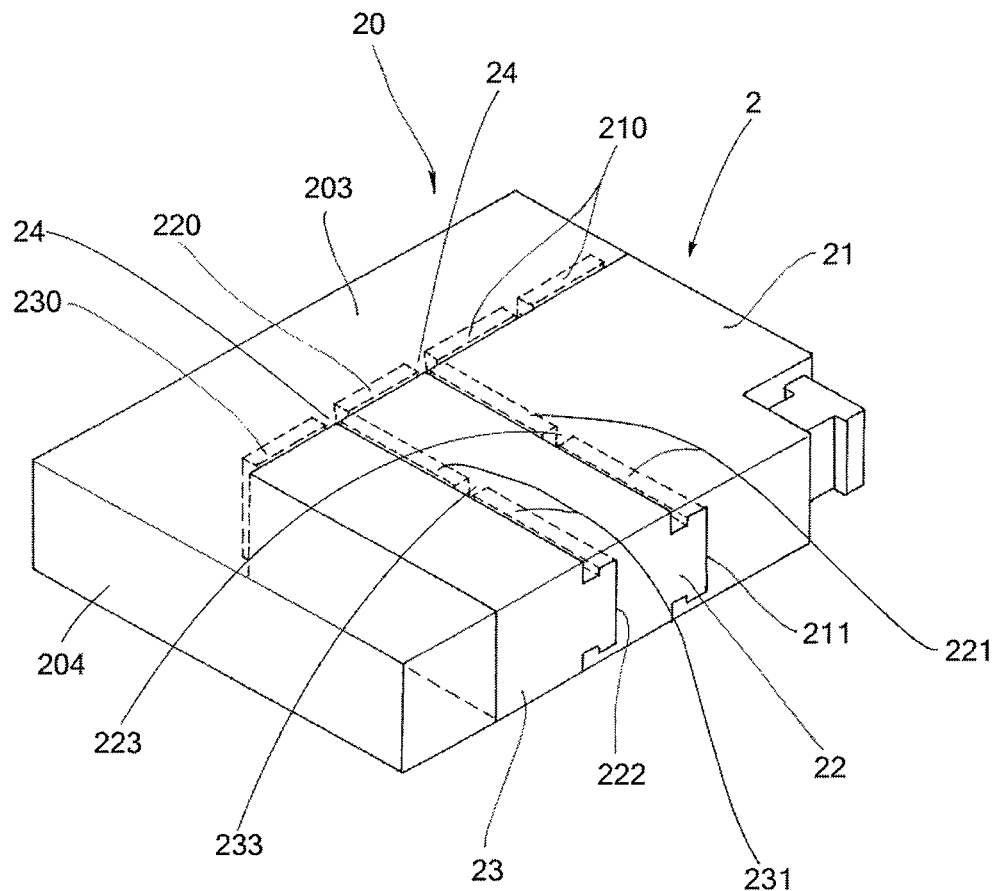
FIG. 3 is a perspective view of a support structure in accordance with another preferred embodiment of the present invention.

Referring to FIG. 3 with reference to FIG. 2, the first guide rail 210 of the support block 21 has a length smaller than a width of the support block 21, the second guide rail 220 of the connecting block 22 has a length smaller than a width of the connecting block 22, and the third guide rail 230 of the extension block 23 has a length smaller than a width of the extension block 23, so that a gap 24 is defined between the first guide rail 210 of the support block 21 and the second guide rail 220 of the connecting block 22 and is defined between the second guide rail 220 of the connecting block 22 and the third guide rail 230 of the extension block 23 to facilitate sliding of the first guide rail 210 of the support block 21, the second guide rail 220 of the connecting block 22 and the third guide rail 230 of the extension block 23. In addition, the first connecting rail 221 of the connecting block 22 has a side provided with a clearance 223 to facilitate sliding of the first connecting rail 221 of the connecting block 22, and the second connecting rail 231 of the extension block 23 has a side provided with a clearance 233 to facilitate sliding of the second connecting rail 231 of the extension block 23.

Figure 4:
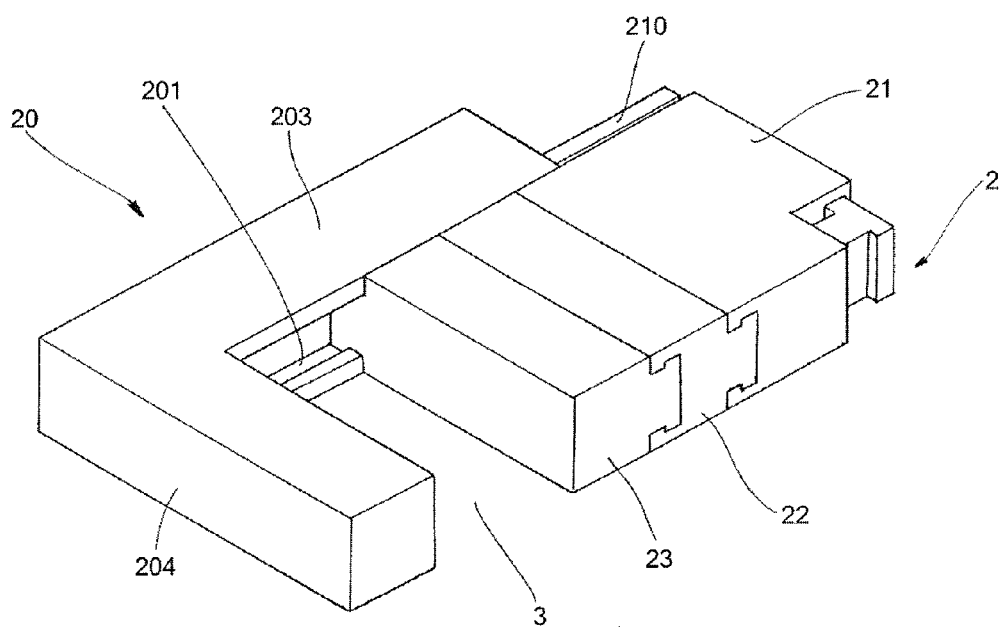
FIG. 4 is a schematic operational view of the support structure for an electronic product as shown in FIG. 1.
Figure 5:
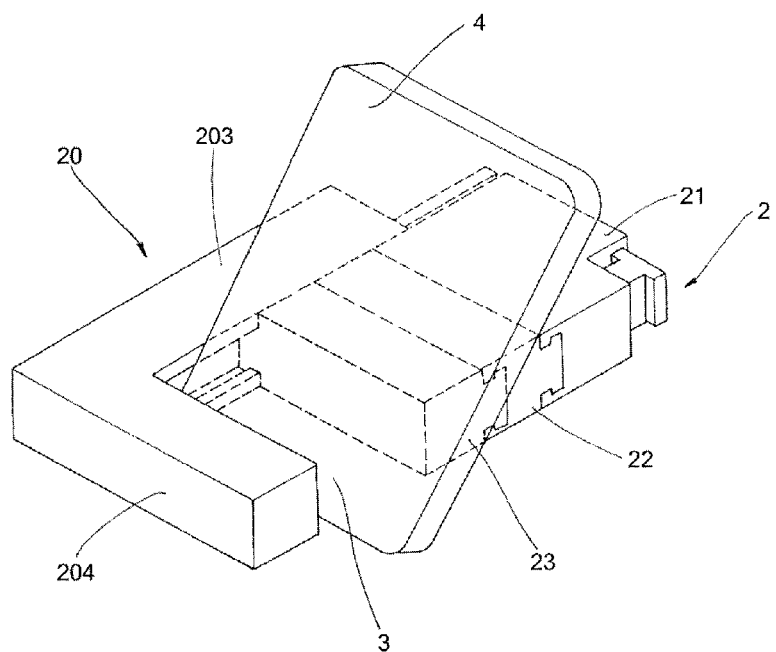
FIG. 5 is a schematic operational view of the support structure for an electronic product as shown in FIG. 4 in use.

Referring to FIGS. 4 and 5 with reference to FIG. 2, the support block 21, the connecting block 22 and the extension block 23 are movable relative to the base 20 so that a space 3 is defined between the shorter side 204 of the base 20 and the extension block 23. Thus, an electronic product 4, such as a tablet PC, a digital photo frame, an electronic book, an electronic screen, a cell phone, an i-pad, an MP3, 4 or 5 and the like, is placed in the space 3 and is supported between the shorter side 204 of the base 20 and the extension block 23 in an inclined manner. At this time, the support block 21, the connecting block 22 and the extension block 23 are movable relative to the base 20 to adjust the inclined angle of the electronic product 4.

Figure 6:
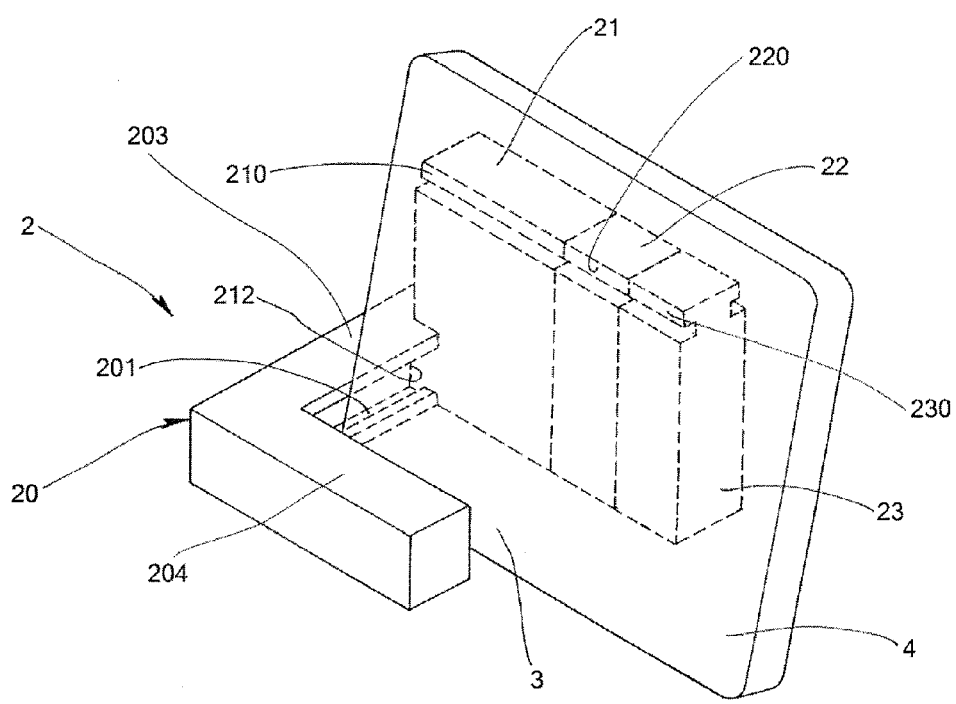
FIG. 6 is a perspective operational view of the support structure for an electronic product in accordance with another preferred embodiment of the present invention.

Referring to FIG. 6 with reference to FIG. 2, the support block 21, the connecting block 22 and the extension block 23 are combined together and are disposed at an upright state. Then, the side rail 212 of the support block 21 is inserted into the first guide channel 201 of the base 20. Then, the side rail 212 of the support block 21 is movable relative to the base 20 so that a space 3 is defined between the shorter side 204 of the base 20 and the support block 21, the connecting block 22 and the extension block 23. Thus, the electronic product 4 is placed in the space 3 and is supported between the shorter side 204 of the base 20 and the support block 21, the connecting block 22 and the extension block 23 in an inclined manner. At this time, the side rail 212 of the support block 21 is movable relative to the base 20 to adjust the inclined angle of the electronic product 4.

Figure 7:
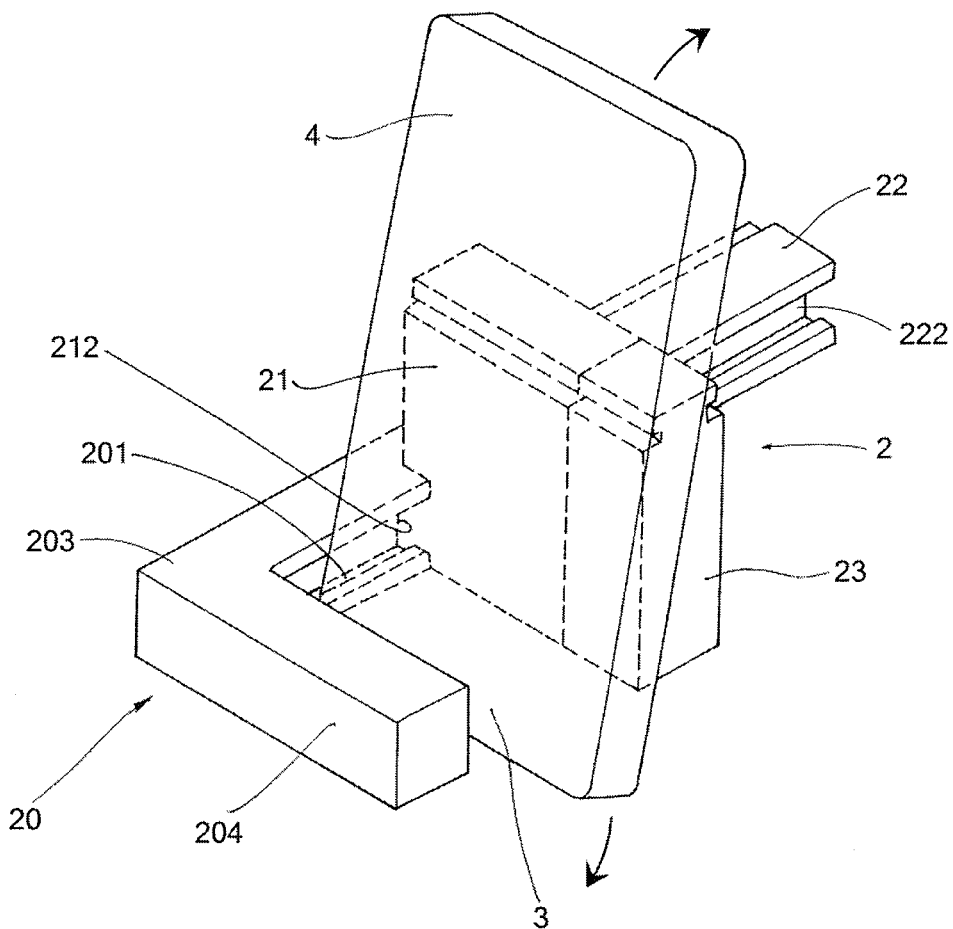
FIG. 7 is a perspective operational view of the support structure for an electronic product in accordance with another preferred embodiment of the present invention.

Referring to FIG. 7 with reference to FIG. 2, the second connecting rail 231 of the extension block 23 is inserted into the first connecting channel 211 of the support block 21. Thus, the support block 21 and the extension block 23 are combined together and are disposed at an upright state. Then, the side rail 212 of the support block 21 is inserted into the first guide channel 201 of the base 20. Then, the side rail 212 of the support block 21 is movable relative to the base 20 so that a space 3 is defined between the shorter side 204 of the base 20 and the support block 21. Thus, the electronic product 4 is placed in the space 3 and is supported between the shorter side 204 of the base 20 and the support block 21 in an inclined manner. At this time, the side rail 212 of the support block 21 is movable relative to the base 20 to adjust the inclined angle of the electronic product 4. Preferably, the second guide rail 220 of the connecting block 22 is inserted into the second guide channel 202 of the base 20 so that the connecting block 22 is in line with the longer side 203 of the base 20 to extend the base 20.

Figure 8:
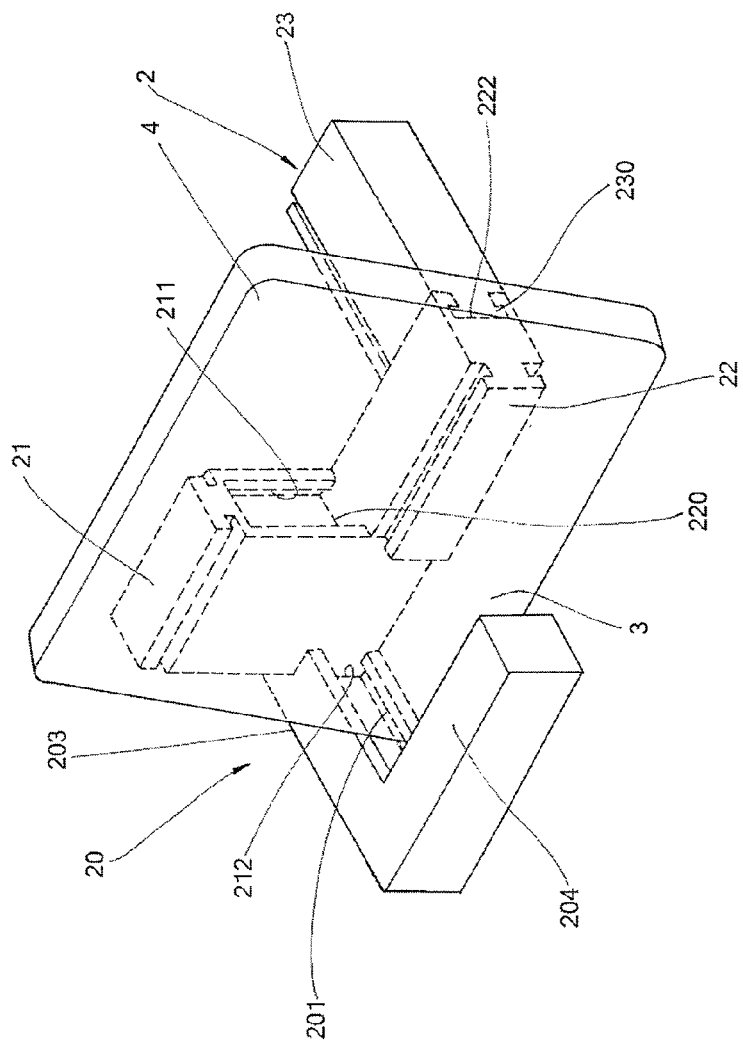
FIG. 8 is a perspective operational view of the support structure for an electronic product in accordance with another preferred embodiment of the present invention.

Referring to FIG. 8 with reference to FIG. 2, the side rail 212 of the support block 21 is inserted into the first guide channel 201 of the base 20. Then, the second guide rail 220 of the connecting block 22 is inserted into the first connecting channel 211 of the support block 21. Then, the third guide rail 230 of the extension block 23 is inserted into the second connecting channel 222 of the connecting block 22. Thus, the support block 21 is disposed at an upright state, the connecting block 22 is disposed at a transverse state, and the extension block 23 is disposed at a transverse state and is parallel with the longer side 203 of the base 20 to extend the base 20.

Figure 9:
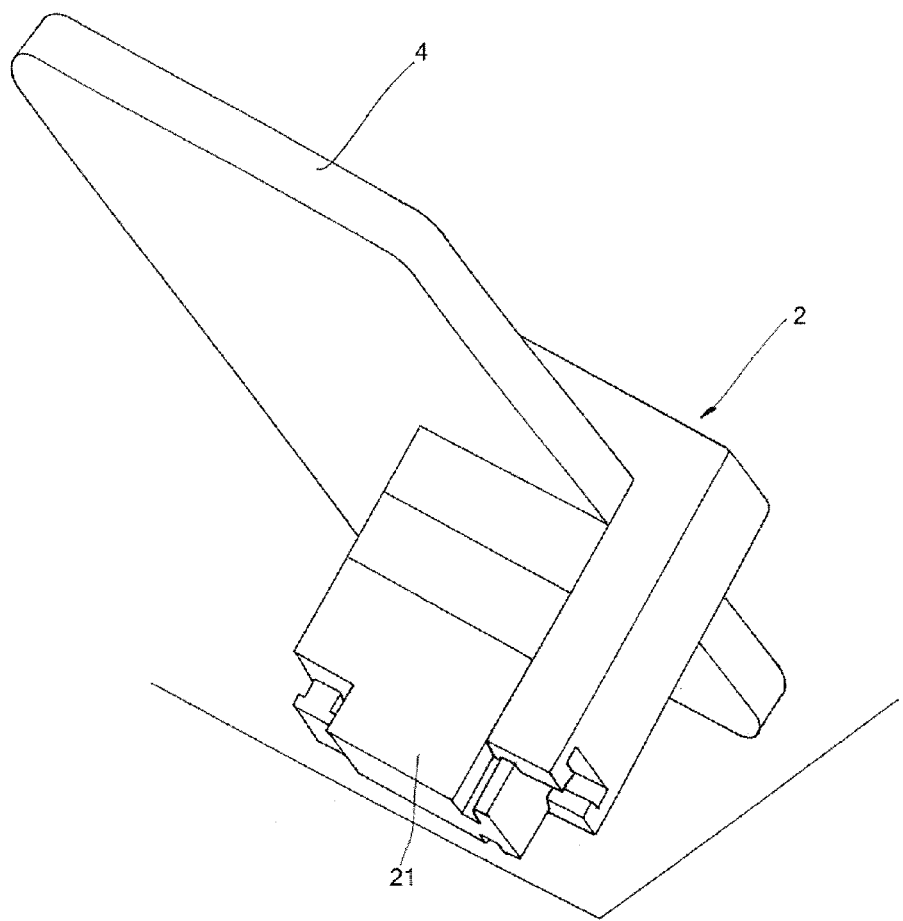
FIG. 9 is a perspective operational view of the support structure for an electronic product in accordance with another preferred embodiment of the present invention.

Referring to FIG. 9 with reference to FIG. 2, the electronic product 4 is clamped by the support structure 2, and is inclined with the support block 21 of the support structure 2 so that the electronic product 4 and the support block 21 of the support structure 2 for two fulcrums. Thus, the electronic product 4 and the support block 21 of the support structure 2 are placed on a table.

Figure 10:
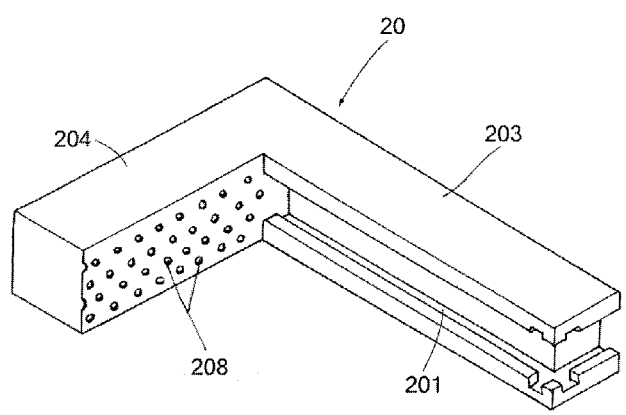
FIG. 10 is a perspective view of a base of the support structure in accordance with another preferred embodiment of the present invention.

Referring to FIG. 10, the shorter side 204 of the base 20 has a side provided with a plurality of particles 208 to enhance the friction of the base 20.

Figure 11:
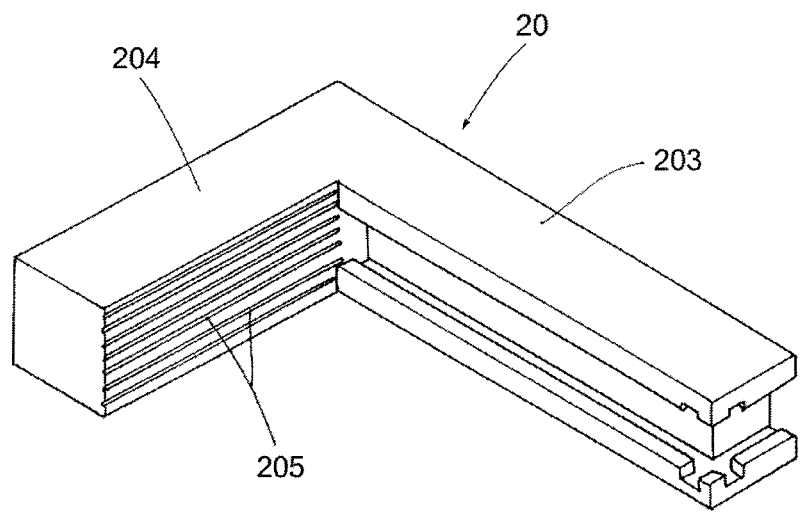
FIG. 11 is a perspective view of a base of the support structure in accordance with another preferred embodiment of the present invention.

Referring to FIG. 11, the shorter side 204 of the base 20 has a side provided with a plurality of elongate ribs 205 to enhance the friction of the base 20.

Figure 12:
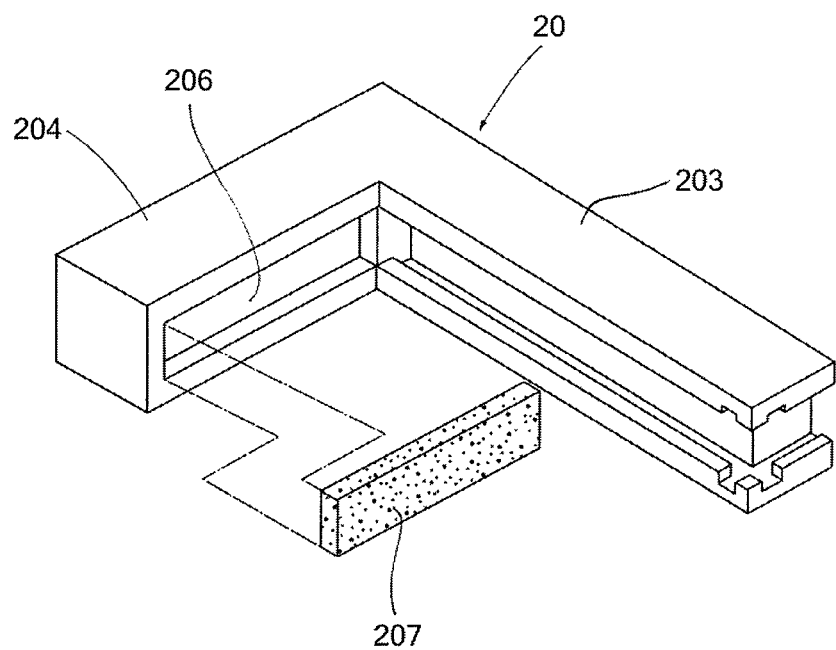
FIG. 12 is an exploded perspective view of a base of the support structure in accordance with another preferred embodiment of the present invention.

Referring to FIG. 12, the shorter side 204 of the base 20 has a side provided with an elongate slot 206 to receive an elongate anti-skid pad 207 so as to provide an anti-skid function.

Figure 13:
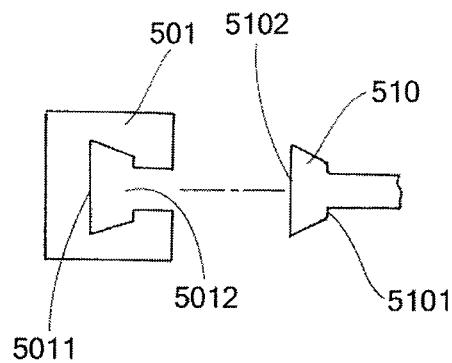
FIG. 13 is a partially front exploded view of a rail and a channel of the support structure in accordance with another preferred embodiment of the present invention.
Figure 14:
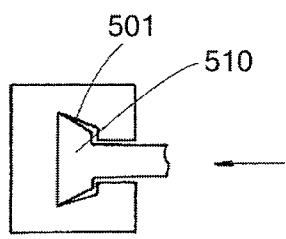
FIG. 14 is a front assembly view of the rail and the channel of the support structure as shown in FIG. 13.

Referring to FIGS. 13 and 14 with reference to FIG. 2, the channel 501 has an inner side 5011 and an outer side 5012, and has a width decreased gradually from the inner side 5011 to the outer side 5012 thereof. The rail 510 has an inner side 5101 and an outer side 5102, and has a thickness increased gradually from the inner side 5101 to the outer side 5102 thereof. In addition, the channel 501 has a size greater than that of the rail 510. It is appreciated that, the channel 501 includes the first guide channel 201, the second guide channel 202, the first connecting channel 211 and the second connecting channel 222, and the rail 510 includes the first guide rail 210, the side rail 212, the second guide rail 220, the first connecting rail 221, the third guide rail 230 and the second connecting rail 231.

Figure 15:
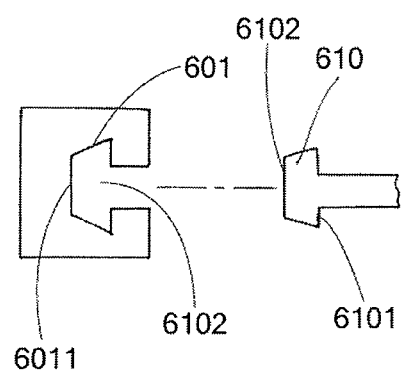
FIG. 15 is a partially front exploded view of a rail and a channel of the support structure in accordance with another preferred embodiment of the present invention.
Figure 16:
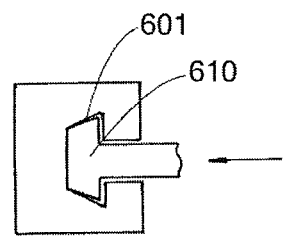
FIG. 16 is a front assembly view of the rail and the channel of the support structure as shown in FIG. 15.

Referring to FIGS. 15 and 16 with reference to FIG. 2, the channel 601 has an inner side 6011 and an outer side 6012, and has a width increased gradually from the inner side 6011 to the outer side 6012 thereof. The rail 610 has an inner side 6101 and an outer side 6102, and has a thickness decreased gradually from the inner side 6101 to the outer side 6102 thereof. In addition, the channel 601 has a size greater than that of the rail 610.

Accordingly, the base 20, the support block 21, the connecting block 22 and the extension block 23 are combined in different manners so that the inclined angle, space and height of the support structure 2 can be adjusted arbitrarily so as to support the electronic product 4 of different specifications and sizes, thereby enhancing the versatility of the support structure 2, and thereby decreasing the costs of purchase.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A support structure, comprising:
a base, a support block, at least one connecting block, and an extension block;
wherein the base has a substantially L-shaped profile and has a longer side and a shorter side;
the longer side of the base is provided with a first guide channel and a second guide channel;
the support block has an end portion provided with a first guide rail;
the support block has a first side provided with a first connecting channel and a second side provided with a side rail;
the connecting block has an end portion provided with a second guide rail;
the connecting block has a first side provided with a first connecting rail and a second side provided with a second connecting channel;
the extension block has an end portion provided with a third guide rail;
the extension block has a side provided with a second connecting rail;
the second guide channel of the base is perpendicular to the first guide channel of the base;
the first guide rail of the support block is perpendicular to the first connecting channel of the support block and perpendicular to the side rail of the support block;
the second guide rail of the connecting block is perpendicular to the first connecting rail of the connecting block and perpendicular to the second connecting channel of the connecting block; and
the third guide rail of the extension block is perpendicular to the second connecting rail of the extension block.

2. The support structure of claim 1, wherein
the base is made of a flexible material and has an anti-slip function;
the support block is made of a flexible material and has an anti-slip function;
the connecting block is made of a flexible material and has an anti-slip function;
the extension block is made of a flexible material and has an anti-slip function.

3. A support structure, comprising:
a base, a support block, at least one connecting block, and an extension block;
wherein the base has a substantially L-shaped profile and has a longer side and a shorter side;
the longer side of the base is provided with a first guide channel and a second guide channel;
the support block has an end portion provided with a first guide rail;
the support block has a first side provided with a first connecting channel and a second side provided with a side rail;
the connecting block has an end portion provided with a second guide rail;
the connecting block has a first side provided with a first connecting rail and a second side provided with a second connecting channel;
the extension block has an end portion provided with a third guide rail;
the extension block has a side provided with a second connecting rail;
the first connecting rail of the connecting block is inserted into the first connecting channel of the support block so that the connecting block is combined with the support block, and the second guide rail of the connecting block is parallel with the first guide rail of the support block;
the second connecting rail of the extension block is inserted into the second connecting channel of the connecting block so that the extension block is combined with the connecting block, and the third guide rail of the extension block is parallel with the second guide rail of the connecting block;
the support block, the connecting block and the extension block are combined together and are disposed at a transverse state;
the third guide rail of the extension block, the second guide rail of the connecting block and the first guide rail of the support block are in turn inserted into the first guide channel of the base;
the base, the support block, the connecting block and the extension block are combined together and are disposed at a transverse state.

4. The support structure of claim 1, wherein
the first connecting rail of the connecting block has a side provided with a clearance;
the second connecting rail of the extension block has a side provided with a clearance.

5. The support structure of claim 3, wherein
the support block, the connecting block and the extension block are movable relative to the base;
a space is defined between the shorter side of the base and the extension block.

6. A support structure, comprising:
a base, a support block, at least one connecting block, and an extension block;
wherein the base has a substantially L-shaped profile and has a longer side and a shorter side;
the longer side of the base is provided with a first guide channel and a second guide channel;
the support block has an end portion provided with a first guide rail;

the support block has a first side provided with a first connecting channel and a second side provided with a side rail;

the connecting block has an end portion provided with a second guide rail;

the connecting block has a first side provided with a first connecting rail and a second side provided with a second connecting channel;

the extension block has an end portion provided with a third guide rail;

the extension block has a side provided with a second connecting rail;

the first connecting rail of the connecting block is inserted into the first connecting channel of the support block so that the connecting block is combined with the support block, and the second guide rail of the connecting block is parallel with the first guide rail of the support block;

the second connecting rail of the extension block is inserted into the second connecting channel of the connecting block so that the extension block is combined with the connecting block, and the third guide rail of the extension block is parallel with the second guide rail of the connecting block;

the support block, the connecting block and the extension block are combined together and are disposed at an upright state;

the side rail of the support block is inserted into the first guide channel of the base;

the side rail of the support block is movable relative to the base;

a space is defined between the shorter side of the base and the support block, the connecting block and the extension block.

7. The support structure of claim 1, wherein the second connecting rail of the extension block is inserted into the first connecting channel of the support block;

the support block and the extension block are combined together and are disposed at an upright state;

the side rail of the support block is inserted into the first guide channel of the base;

the side rail of the support block is movable relative to the base;

a space is defined between the shorter side of the base and the support block;

the second guide rail of the connecting block is inserted into the second guide channel of the base;

the connecting block is in line with the longer side of the base to extend the base.

8. The support structure of claim 1, wherein the side rail of the support block is inserted into the first guide channel of the base;

the second guide rail of the connecting block is inserted into the first connecting channel of the support block;

the third guide rail of the extension block is inserted into the second connecting channel of the connecting block;

the support block is disposed at an upright state;

the connecting block is disposed at a transverse state;

the extension block is disposed at a transverse state and is parallel with the longer side of the base to extend the base.

9. The support structure of claim 1, wherein the shorter side of the base has a side provided with a plurality of particles.

10. The support structure of claim 1, wherein the shorter side of the base has a side provided with a plurality of elongate ribs.

11. The support structure of claim 1, wherein the shorter side of the base has a side provided with an elongate slot to receive an elongate anti-skid pad.

12. The support structure of claim 1, wherein each of the first guide channel, the second guide channel, the first connecting channel and the second connecting channel has an inner side and an outer side, and has a width decreased gradually from the inner side to the outer side thereof;

each of the first guide rail, the side rail, the second guide rail, the first connecting rail, the third guide rail and the second connecting rail has an inner side and an outer side, and has a thickness increased gradually from the inner side to the outer side thereof.

13. The support structure of claim 1, wherein each of the first guide channel, the second guide channel, the first connecting channel and the second connecting channel has an inner side and an outer side, and has a width increased gradually from the inner side to the outer side thereof;

each of the first guide rail, the side rail, the second guide rail, the first connecting rail, the third guide rail and the second connecting rail has an inner side and an outer side, and has a thickness decreased gradually from the inner side to the outer side thereof.

* * * * *